United States Patent
Akilan et al.

(10) Patent No.: US 11,645,616 B1
(45) Date of Patent: May 9, 2023

(54) VERIFYING THE INTEGRITY OF DATA TRANSMITTED BETWEEN A FIRMWARE AND A BASEBOARD MANAGEMENT CONTROLLER (BMC)

(71) Applicant: AMERICAN MEGATRENDS INTERNATIONAL, LLC, Duluth, GA (US)

(72) Inventors: Raj Velusamy Akilan, Coimbatore (IN); Manish Jha, Duluth, GA (US); Manickavasakam Karpagavinayagam, Norcross, GA (US); Igor Kulchytskyy, Lawrenceville, GA (US); Altaf Hussain, Chennai (IN); Harikrishna Doppalapudi, Norcross, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 341 days.

(21) Appl. No.: 17/111,140

(22) Filed: Dec. 3, 2020

(51) Int. Cl.
*G06F 9/44* (2018.01)
*G06Q 10/087* (2023.01)
(Continued)

(52) U.S. Cl.
CPC ......... *G06Q 10/087* (2013.01); *G06F 21/572* (2013.01); *H04L 41/0869* (2013.01); *G06F 2221/033* (2013.01)

(58) Field of Classification Search
CPC ............ G06F 21/572; G06F 2221/033; G06Q 10/087; H04L 41/0869
(Continued)

(56) References Cited

U.S. PATENT DOCUMENTS 9,021,076 B2 * 4/2015 Austen .................. G06F 15/161
709/219
9,921,915 B2 * 3/2018 Hung .................. G06F 11/1417
(Continued)

OTHER PUBLICATIONS

Santos et al., "Hunting for Hardware Changes in Data Centres", 2012, International Conference on Computing in High Energy and Nuclear Physics, 4 pages. (Year: 2012).*
(Continued)

*Primary Examiner* — Ted T. Vo
(74) *Attorney, Agent, or Firm* — Newport IP, LLC; Leonard J. Hope

(57) ABSTRACT

Technologies are described for verifying the integrity of data transmitted between a firmware and a baseboard management controller ("BMC"). During a first verification phase, a data integrity tool compares system inventory data provided by firmware protocols to a system inventory module to system inventory data in a device instance format. During a second verification phase, the data integrity tool verifies operation of a firmware conversion module by comparing the system inventory data in the device instance format to the system inventory data in a JavaScript Object Notation ("JSON") format. During a third verification phase, the data integrity tool retrieves the system inventory data from a management server and compares the system inventory data retrieved from the management server to the system inventory data previously transmitted to the management server. Identified discrepancies can be utilized to modify the system inventory module, the firmware conversion module, or the management server.

20 Claims, 11 Drawing Sheets

(51) Int. Cl.
*G06F 21/57* (2013.01)
*H04L 41/0869* (2022.01)

(58) Field of Classification Search
USPC .................................. 717/120–122, 168–178
See application file for complete search history.

(56) References Cited

U.S. PATENT DOCUMENTS

| | | | | |
|---|---|---|---|---|
| 10,404,523 | B2 * | 9/2019 | Cencini ................. | H04L 41/044 |
| 10,521,273 | B2 * | 12/2019 | Mullender ............ | G06F 9/4411 |
| 11,385,908 | B1 * | 7/2022 | Kulchytskyy ............. | G06F 8/65 |
| 11,474,807 | B1 * | 10/2022 | Huang .................. | G06F 16/128 |
| 11,513,984 | B2 * | 11/2022 | Bhatia ................... | G06F 9/4408 |

OTHER PUBLICATIONS

Nawaz et al., "Server Firmware Management using DMTF Redfish REST API's", 2020, International Research Journal of Engineering and Technology, pp. 5306-5309. (Year: 2020).*

* cited by examiner

PHASE I: SYSTEM INVENTORY DATA INTEGRITY – START

| ATTRIBUTE NAME | | SMBIOS OUTPUT | SYSTEM INVENTORY MODULE OUTPUT | STATUS |
|---|---|---|---|---|
| SYSTEM INFO: | MFG | DEFAULT STRING | DEFAULT STRING | MATCH |
| | SERIAL NO. | DEFAULT STRING | DEFAULT STRING | MATCH |
| | SKU | DEFAULT STRING | DEFAULT STRING | MATCH |
| | BIOS VERSION | 5.18 | 5.18 | MATCH |
| CHASSIS INFO: | CHASSIS TYPE | 3 | 3 | MATCH |
| | MFG | DEFAULT STRING | DEFAULT STRING | MATCH |
| | SERIAL NO. | DEFAULT STRING | DEFAULT STRING | MATCH |
| | SKU | DEFAULT STRING | DEFAULT STRING | MATCH |

PHASE I: SYSTEM INVENTORY DATA INTEGRITY – DONE – STATUS: PASS

SYSTEM INVENTORY DATA INTEGRITY REPORT (PHASE I)

FIG. 2B

SYSTEM INVENTORY DATA INTEGRITY ANALYSIS – PHASE II

PHASE II: SYSTEM INVENTORY DATA INTEGRITY – START

| ATTRIBUTE NAME | | REDFISH BIOS DATA | SYSTEM INVENTORY MODULE OUTPUT | STATUS |
|---|---|---|---|---|
| SYSTEM INFO: | ASSET TAG | SYSTEM_1 | SYSTEM_1 | MATCH |
| | DESCRIPTION | SYSTEM_1 | SYSTEM_1 | MATCH |
| | MFG | DEFAULT STRING | DEFAULT STRING | MATCH |
| | MODEL | AMXRFSH | AMXRFSH | MATCH |
| CHASSIS INFO: | ASSET TAG | CHASSIS_1 | CHASSIS_1 | MATCH |
| | DESCRIPTION | CHASSIS_1 | CHASSIS_1 | MATCH |
| | MFG | DEFAULT STRING | DEFAULT STRING | MATCH |
| | MODEL | AMXCHSS | AMXCHSS | MATCH |

PHASE II: SYSTEM INVENTORY DATA INTEGRITY – DONE – STATUS: PASS

SYSTEM INVENTORY DATA INTEGRITY REPORT (PHASE II)

FIG. 3B

SYSTEM INVENTORY DATA INTEGRITY ANALYSIS – PHASE III

PHASE III: SYSTEM INVENTORY DATA INTEGRITY – START

| ATTRIBUTE NAME | | REDFISH BIOS DATA | REDFISH BMC DATA | STATUS |
|---|---|---|---|---|
| SYSTEM INFO: | ASSET TAG | SYSTEM_1 | SYSTEM_1 | MATCH |
| | DESCRIPTION | SYSTEM_1 | SYSTEM_1 | MATCH |
| | MFG | DEFAULT STRING | DEFAULT STRING | MATCH |
| | MODEL | AMXRFSH | AMXRFSH | MATCH |
| CHASSIS INFO: | ASSET TAG | CHASSIS_1 | CHASSIS_1 | MATCH |
| | DESCRIPTION | CHASSIS_1 | CHASSIS_1 | MATCH |
| | MFG | DEFAULT STRING | DEFAULT STRING | MATCH |
| | MODEL | AMXCHSS | AMXCHSS | MATCH |

PHASE III: SYSTEM INVENTORY DATA INTEGRITY – DONE – STATUS: PASS

SYSTEM INVENTORY DATA INTEGRITY REPORT (PHASE III)

FIG. 4B

VERIFYING THE INTEGRITY OF DATA TRANSMITTED BETWEEN A FIRMWARE AND A BASEBOARD MANAGEMENT CONTROLLER (BMC)

BACKGROUND

Scalability in today's data center is increasingly achieved with horizontal, scale-out solutions, which often include large quantities of simple servers. In order to enable platform management in large server installations such as these, managed computing systems commonly include a baseboard management controller ("BMC"). A BMC is a specialized service processor that monitors the physical state of a computer, network server, or other hardware device using sensors and communicates with a system administrator through an out-of-band ("OOB") network connection.

As a part of its operation, a BMC can receive various types of management data from a managed computing system (which might also be referred to herein simply as a "computing system"). The management data can include, among other things, system inventory data that identifies the various components in the managed computing system. The BMC, in turn, can provide the system inventory data to a management client through an OOB network connection.

The process of collecting system inventory data, providing the system inventory data to a BMC and, subsequently, providing the system inventory data from the BMC to a management client is highly complex and typically involves multiple firmware components. This complexity is exacerbated by the fact that modern managed computing systems commonly have large numbers of components that are identified by the system inventory data. As a result, the process of collecting system inventory data in a managed computing system and providing this data to a management client can be error prone. Additionally, given the complexity of this process and the large amount of data collected, processed, and transmitted, it can be very difficult for software developers to identify and address the source of problems in firmware or BMC components responsible for collecting, processing, and distributing system inventory data.

It is with respect to these and other considerations that the disclosure made herein is presented.

SUMMARY

Technologies are described herein for verifying the integrity of data transmitted between a firmware and a BMC. Through implementations of the disclosed technologies, system inventory data collected by a firmware and transmitted to a BMC and a remote management client can be verified. Based upon the verification of the system inventory data, modifications can be made to firmware or BMC components to address problems effecting the system inventory data. In this way, firmware and/or BMC components can operate more efficiently and without errors, thereby improving computing system performance. Technical benefits other than those specifically mentioned herein can also be realized through an implementation of the disclosed technologies.

As described briefly above, various components of a firmware of a managed computing system can collect management data, including system inventory data identifying the components in a managed computing system. For example, and without limitation, a firmware module (which might be referred to herein as a "system inventory module") can collect system inventory data from one or more firmware protocols at a boot time of the managed computing system.

The system inventory module, in turn, converts the system inventory data obtained from the protocols to a device instance format and provides the system inventory data in the device instance format to a second firmware module (which might be referred to herein as a "firmware conversion module"). The firmware conversion module converts the system inventory data in the device instance format to a JavaScript Object Notation ("JSON") format. In particular, the firmware conversion module can use the system inventory data in the device instance format to generate system inventory data in a REDFISH-compatible JSON format based on an Open Data Protocol ("OData").

In turn, the firmware conversion module transmits the system inventory data in the JSON format to a management server in a BMC of the managed computing system. In one embodiment, the management server exposes an interface for receiving the system inventory data. In particular, the interface provided by the management server can be implemented as REDFISH-compatible Representational State Transfer ("REST") interface provided over secure Hypertext Transport Protocol ("HTTP") that utilizes a JSON format that is based on OData in some embodiments disclosed herein. The management server stores the system inventory data in an appropriate data store in the BMC. The management server, in turn, can generate a REST HTTP response to the REST HTTP request such as, for example, a response including data indicating that the REST HTTP request was successful.

In some embodiments, the management server also exposes an interface, such as a REDFISH-compatible interface, through which management clients can request the system inventory data through an OOB interface. In response to receiving a request on such an interface, the management server can retrieve the requested system inventory data from the data store and provide the system inventory data to the management client. The interface can be provided over an OOB network connection, for example.

In some embodiments, a data integrity tool is utilized to verify the operation of the system inventory module, the firmware conversion module, and the management server. In particular, the data integrity tool can verify the system inventory data during the various processes described above. Verification is performed in multiple phases in one embodiment.

During a first verification phase, the data integrity tool verifies operation of the system inventory module by comparing the system inventory data provided by the firmware protocols to the system inventory module to the system inventory data in the device instance format. The comparison can be performed using property mapping data that maps properties of the system inventory data provided by the firmware protocols to corresponding properties in the system inventory data in the device instance format.

If the data integrity tool identifies discrepancies between the system inventory data provided by the firmware protocols and the system inventory data in the device instance format, the data integrity tool updates a system inventory data integrity report to reflect the discrepancy. In this manner, the system inventory data integrity report identifies discrepancies between the system inventory data provided by the one or more firmware protocols and the system inventory data in the device instance format.

During a second verification phase, the data integrity tool verifies operation of the firmware conversion module by comparing the system inventory data in the device instance format to the system inventory data in the JSON format. The comparison can be performed using property mapping data that maps properties of the system inventory data in the device instance format to properties of the system inventory data in the JSON format.

If the data integrity tool identifies discrepancies between the system inventory data in the device instance format and the system inventory data in the JSON format, the data integrity tool updates the system inventory data integrity report to reflect the discrepancy. In this manner, the system inventory data integrity report identifies discrepancies between the system inventory data in the device instance format and the system inventory data in the JSON format.

During a third verification phase, the data integrity tool retrieves the system inventory data in the JSON format from the management server. The data integrity tool then compares the system inventory data in the JSON format retrieved from the management server to the system inventory data in the JSON format transmitted by the firmware conversion module to the management server. If the data integrity tool identifies discrepancies between the system inventory data in the JSON format retrieved from the management server and the system inventory data in the JSON format transmitted by the firmware conversion module to the management server, the data integrity tool updates the system inventory data integrity report to reflect the discrepancy. In this manner, the system inventory data integrity report identifies discrepancies between the system inventory data in the JSON format retrieved from the management server and the system inventory data in the JSON format transmitted to the management server.

If the system inventory data integrity report identifies discrepancies, the identified discrepancies can be utilized to modify the system inventory module, the firmware conversion module, or the management server. For instance, discrepancies identified during the first verification phase are indicative of a problem, or problems, in the system inventory module. Discrepancies identified during the second verification phase are indicative of problems in the firmware conversion module. Discrepancies identified during the third verification phase are indicative of problems with the management server.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2B is a user interface diagram showing aspects of an illustrative system data integrity report showing results of the comparison operation performed in the manner described with reference to FIG. 2A;

FIG. 3B is a user interface diagram showing aspects of an illustrative system data integrity report showing results of the comparison operation performed in the manner described with reference to FIG. 3A;

FIG. 4B is a user interface diagram showing aspects of an illustrative system data integrity report showing results of the comparison operation performed in the manner described with reference to FIG. 4A;

DETAILED DESCRIPTION

The following detailed description is directed to technologies for verifying the integrity of data transmitted between a firmware and a BMC. As discussed briefly above, through implementations of the disclosed technologies, system inventory data collected by a firmware and transmitted to a BMC and a remote management client can be verified. Based upon the verification of the system inventory data, modifications can be made to firmware or BMC components to address problems effecting the system inventory data. In this way, firmware and/or BMC components can operate more efficiently and without errors, thereby improving computing system performance. Technical benefits other than those specifically mentioned herein can also be realized through an implementation of the disclosed technologies. Additional details regarding these aspects will be provided below with regard to FIGS. 1-7.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
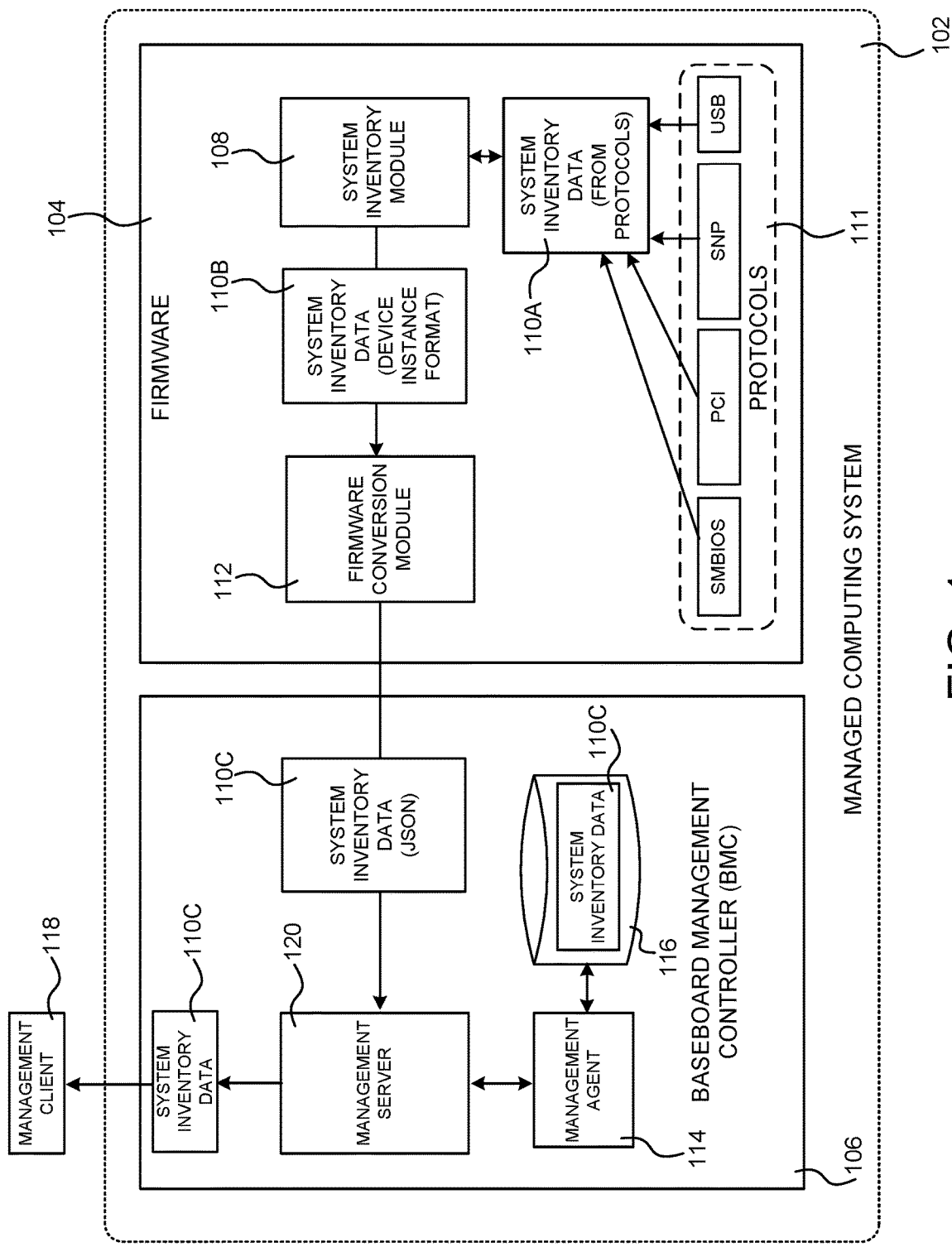
FIG. 1 is a software architecture diagram illustrating aspects of the configuration and operation of a managed computing system capable of verifying the integrity of data transmitted between a firmware and a BMC, according to one or more embodiments presented herein.

FIG. 1 is a software architecture diagram illustrating aspects of the configuration and operation of a managed computing system 102 capable of verifying the integrity of data transmitted between a firmware 104 and a BMC 106, according to one or more embodiments presented herein. As discussed briefly above, managed computing systems, such as that illustrated in FIG. 1, commonly include a BMC 106. A BMC 106 is a specialized service processor that monitors the physical state of a computer, network server, or other hardware device using sensors and communicates with a system administrator through an OOB network connection.

As a part of its operation, a BMC 106 can receive various types of management data from the managed computing system 102. The management data can include, among other things, system inventory data that identifies the various components in the managed computing system 102. The BMC 106 can, in turn, provide the system inventory data to a management client 118 through an OOB network connection (not shown in FIG. 1).

As also described briefly above, the process of collecting system inventory data, providing the system inventory data to a BMC 106 and, subsequently, providing the system inventory data from the BMC 106 to a management client 118 is highly complex and typically involves multiple firmware components. This complexity is exacerbated by the fact that modern managed computing systems commonly have large numbers of components that are identified by the system inventory data. As a result, the process of collecting system inventory data in a managed computing system 102 and providing this data to a management client 118 can be error prone. Additionally, given the complexity of this process and the large amount of data collected, processed, and transmitted, it can be very difficult for software developers to identify and address the source of problems in firmware or BMC components responsible for collecting, processing, and distributing system inventory data. The technologies disclosed herein address these and potentially other technical challenges.

In order to address the technical challenges described above, and potentially others, the BMC 106 communicates with a firmware 104 of the managed computing system 102. The firmware 104 can be implemented to be compliant with the Unified Extensible Firm Interface ("UEFI") Specification. Other types of firmware can be utilized in other embodiments. Additional details regarding the configuration and operation of the firmware 104 in one embodiment are provided below with regard to FIG. 6.

As discussed briefly above, and in further detail below, the firmware 104 collects and provides management data to the BMC 106. Management data can include, but is not limited to, any type of data regarding the configuration or operation of the managed computing system 102. For example, and without limitation, the management data can include data describing the configuration of the firmware 104.

The management data can also include data describing the operational characteristics of a the managed computing system 102 such as, but not limited to, the temperature of one or more components of a managed computing system 102, speed of rotational components (e.g., spindle motor, CPU fan, etc.) within the managed computing system 102, the voltage across or applied to one or more components within the managed computing system 102, and the available and/or used capacity of memory or storage devices within the managed computing system 102. The management data can also include inventory data describing the inventory of the managed computing system 102. The management data can also describe other aspects of the configuration and operational characteristics of the managed computing system 102.

As described briefly above, various components of a firmware 104 of a managed computing system 102 can collect management data, including system inventory data identifying the components in the managed computing system 102. For example, and without limitation, a firmware module 108 (which might be referred to herein as a "system inventory module 108") can collect system inventory data 110A from one or more firmware protocols 111 at a boot time of the managed computing system 102. In the example shown in FIG. 1, for instance, a system management BIOS ("SMBIOS") protocol, a Peripheral Component Interconnect ("PCI") protocol, a Simple Network management ("SNP") protocol, and a Universal Serial Bus ("USB") protocol are providing system inventory data 110A to the system inventory module 108. Other protocols and other types of firmware components can provide system inventory data 110A to the system inventory module 108 in other embodiments.

In one embodiment, the system inventory module 108 converts the system inventory data 110B obtained from the protocols 111 to a device instance format and provides the system inventory data 110B in the device instance format to a second firmware module 112 (which might be referred to herein as a "firmware conversion module 112"). The firmware conversion module 112 converts the system inventory data 110B in the device instance format to a JavaScript Object Notation ("JSON") format.

In particular, the firmware conversion module 112 can use the system inventory data 110B in the device instance format to generate system inventory data 110C in a REDFISH-compatible JSON format based on an Open Data Protocol ("OData"). As known to those skilled in the art, REDFISH is a successor to previous manageability interfaces created by the Desktop Management Taskforce ("DMTF"). REDFISH is an open industry standard specification and schema for simple, modern, and secure management of scalable platform hardware, such as server computers located in data centers. The REDFISH specification and schema specifies a Representational State Transfer ("REST") interface and utilizes JSON and OData to integrate management solutions within existing toolchains.

In turn, the firmware conversion module 112 transmits the system inventory data 110C in the JSON format to a management server 120 in the BMC 106 of the managed computing system 102. In one embodiment, the management server 120 exposes an interface for receiving the system inventory data 110C. In particular, the interface provided by the management server can be implemented as REDFISH-compatible REST interface provided over secure Hypertext Transport Protocol ("HTTP") that utilizes a JSON format that is based on OData in some embodiments disclosed herein. The management server 120 utilizes a management agent 114 to store the system inventory data 110C in an appropriate data store 116 in the BMC 106. The management server 120, in turn, can generate a REST HTTP response to the firmware conversion module 112 such as, for example, a response including data indicating that the REST HTTP request with the system inventory data 110C was successful.

In some embodiments, the management server 120 also exposes an interface (not shown in FIG. 1), such as a REDFISH-compatible interface, through which management clients 118 can request the system inventory data 110C through an OOB interface. In response to receiving a request on such an interface, the management server 120 can retrieve the requested system inventory data 110C from the data store 116 and provide the system inventory data 110C to the management client 118. The interface can be provided over an OOB network connection, for example.

It is to be appreciated that FIG. 1 and the other FIGS. have been simplified for discussion purposes, and that many other software and hardware components can be utilized to implement the functionality disclosed herein. For example, and without limitation, various networks and networking components can be utilized to connect the management client 118 to the BMC 106. In this regard, it is also to be appreciated that while only a single managed computing system 102 and a single management client 118 have been illustrated in FIG. 1, many such computing systems can be utilized in various configurations.

Figure 2A:
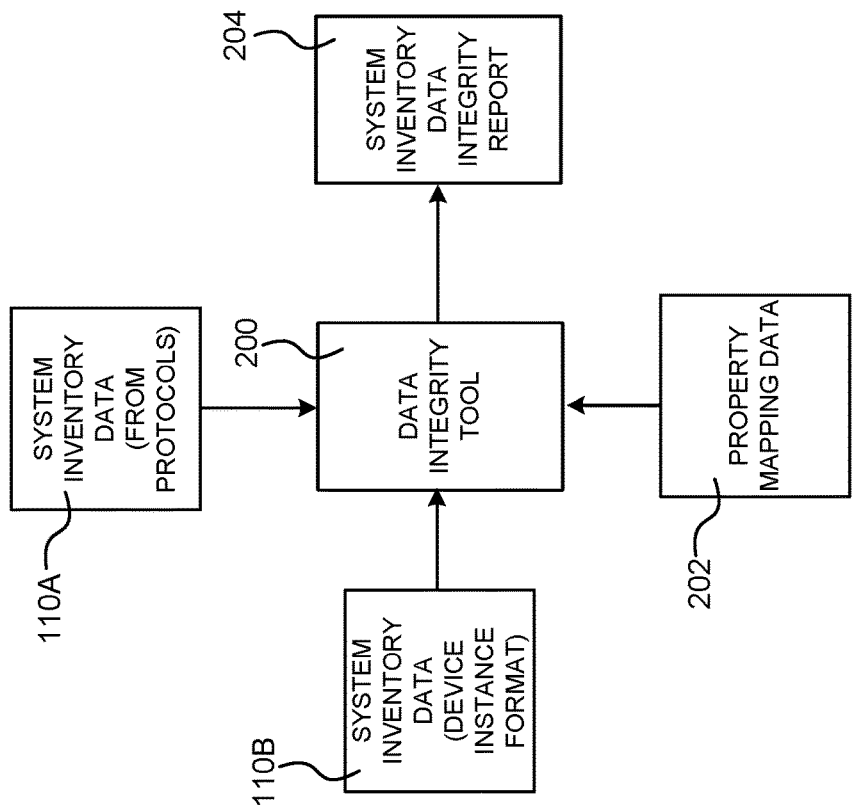
FIG. 2A is a software architecture diagram illustrating aspects of the operation of a data integrity tool for comparing system inventory data received from one or more protocols to system inventory data in a device instance format, according to one or more embodiments presented herein.

FIG. 2A is a software architecture diagram illustrating aspects of the operation of a data integrity tool 200 for comparing system inventory data 110A received from one or more firmware protocols 111 to system inventory data 110B in a device instance format, according to one or more embodiments presented herein. As will be described in greater detail below, the data integrity tool 200 is a software component that is utilized in various embodiments to verify aspects of the operation of the system inventory module 108, the firmware conversion module 112, and the management server 120. In particular, the data integrity tool 200 can verify the system inventory data generated and transferred during the various processes described above with respect to FIG. 1.

Verification of the system inventory data 100 is performed in multiple phases in one embodiment. A first verification phase is described below with reference to FIGS. 2A and 2B, a second verification phase is described below with reference to FIGS. 3A and 3B, and a third verification phase is described below with reference to FIGS. 4A and 4B. Additional details regarding the verification processes described herein are provided with respect to the flow diagrams shown in FIGS. 5A and 5B.

During the first verification phase, which is illustrated in FIG. 2A, the data integrity tool 200 verifies operation of the system inventory module 108 by comparing the system inventory data 110A provided by the firmware protocols 111 to the system inventory module 108 to the system inventory data 110B in the device instance format. The comparison is performed in one embodiment using property mapping data 202 that maps properties of the system inventory data 110A provided by the firmware protocols 111 to corresponding properties in the system inventory data 110B in the device instance format.

If the data integrity tool 200 identifies discrepancies between the system inventory data 110A provided by the firmware protocols 111 and the system inventory data 110B in the device instance format, the data integrity tool 200 updates a system inventory data integrity report 204 to reflect the discrepancy. The system inventory data integrity report 204 contains data that identifies the discrepancies between the system inventory data 110A provided by the firmware protocols 111 and the system inventory data 110B in the device instance format.

FIG. 2B is a user interface diagram showing aspects of an illustrative system data integrity report 204 showing results of the comparison operation performed in the manner described with reference to FIG. 2A. In the illustrated example, the system data integrity report 204 includes a number of fields: an attribute name field that identifies the names of the attributes in the inventory data 110A for which a comparison was performed; a field indicating the values provided for the attributes by the protocols 111 (the SMBIOS protocol in the illustrated example); a field indicating the corresponding values for the attributes in the inventory data 110B; and a field indicating the status of the comparison operation (e.g. whether the values for the attributes in the inventory data 110A matched the values for the same attributes in the inventory data 110B). The system data integrity report 204 can include other types of data identifying other aspects of the comparison operation performed by the data integrity tool 200 in other embodiments.

Figure 3A:
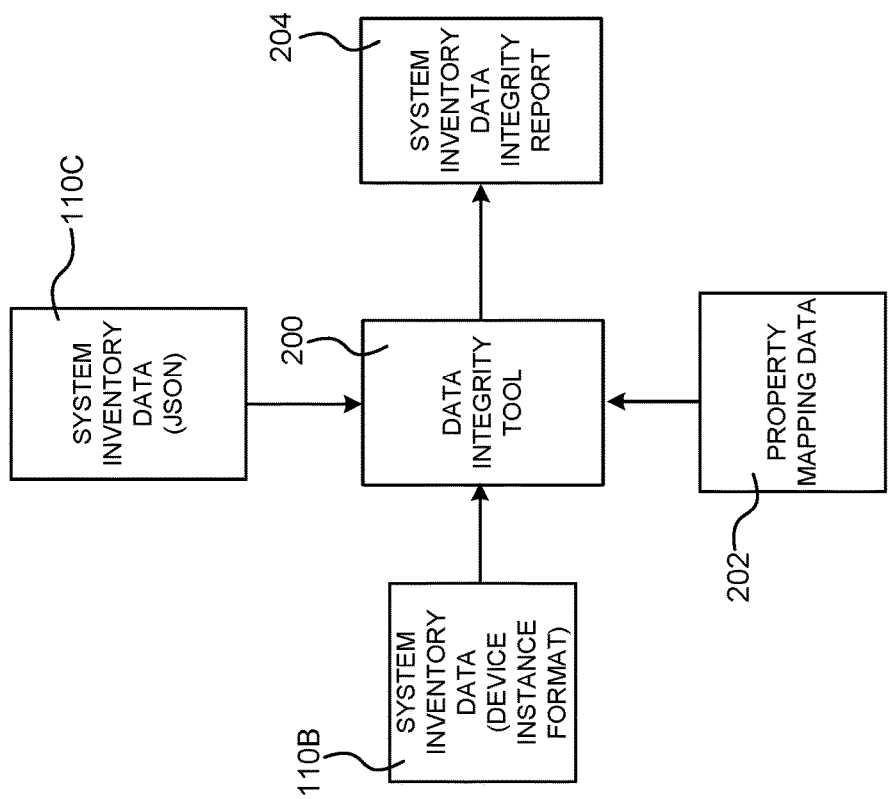
FIG. 3A is a software architecture diagram illustrating aspects of the operation of a data integrity tool for comparing system inventory data in a JSON format to system inventory data in a device instance format, according to one or more embodiments presented herein.

FIG. 3A is a software architecture diagram illustrating aspects of the operation of the data integrity tool 200 during a second verification phase during which it compares the system inventory data 110C in the JSON format to the system inventory data 110B in the device instance format, according to one or more embodiments presented herein. The comparison performed during the second phase can be performed using property mapping data 202 that maps properties of the system inventory data 110B in the device instance format to properties of the system inventory data 110C in the JSON format.

If the data integrity tool 200 identifies discrepancies between the system inventory data 110B in the device instance format and the system inventory data 110C in the JSON format, the data integrity tool 200 updates the system inventory data integrity report 204 to reflect the discrepancy. In this manner, the system inventory data integrity 204 report identifies discrepancies between the system inventory data 110B in the device instance format and the system inventory data 110C in the JSON format.

FIG. 3B is a user interface diagram showing additional aspects of an illustrative system data integrity report 204 showing results of the comparison operation performed in the second verification phase as described with reference to FIG. 3A. In the illustrated example, the system data integrity report 204 includes a number of fields: an attribute name field that identifies the names of the attributes in the inventory data 110B for which a comparison was performed; a field indicating the values provided for the attributes in the system inventory data 110B; a field indicating the corresponding value for the attribute in the inventory data 110C; and a field indicating the status of the comparison operation (e.g. whether the value for the attribute in the inventory data 110B matched the value for the same attribute in the inventory data 110C). The system data integrity report 204 can include other types of data identifying other aspects of the second phase of the verification process performed by the data integrity tool 200 in other embodiments.

Figure 4A:
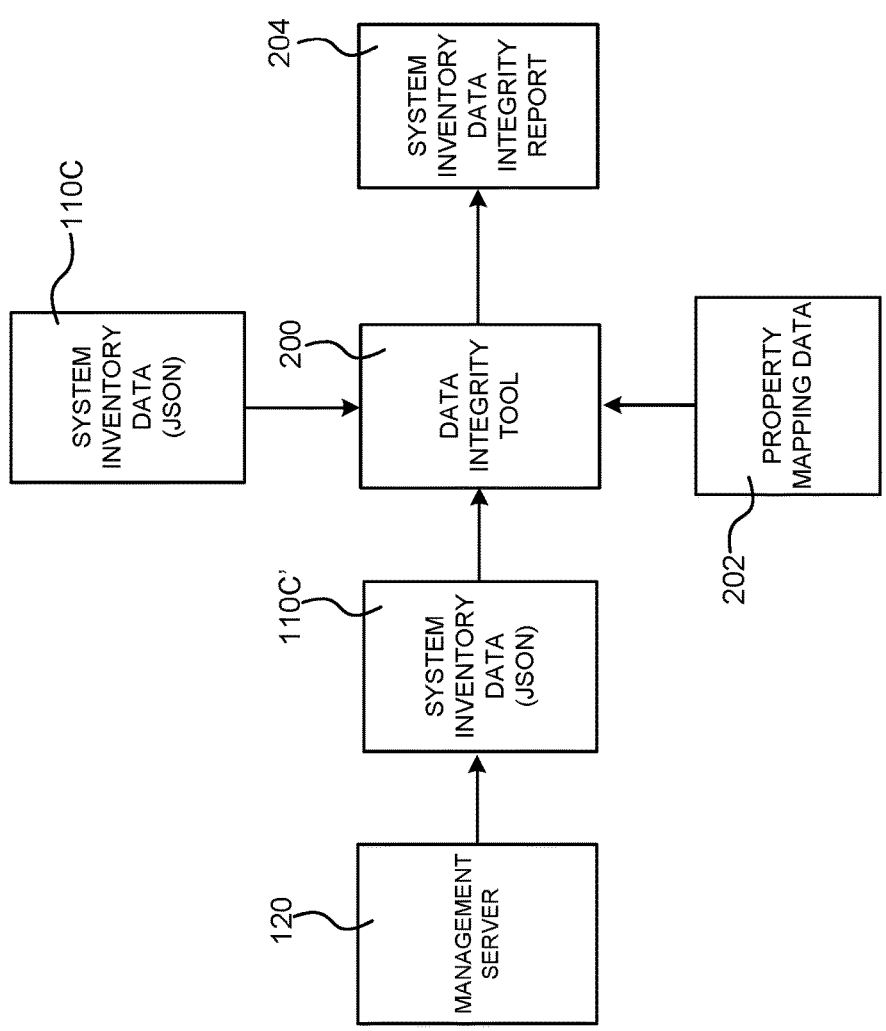
FIG. 4A is a software architecture diagram illustrating aspects of the operation of a data integrity tool for comparing system inventory data in a JSON format received from a BMC to system inventory data in a JSON format transmitted to the BMC, according to one or more embodiments presented herein.

FIG. 4A is a software architecture diagram illustrating aspects of the operation of the data integrity tool 200 for performing a third verification phase during which system inventory data in the JSON format is retrieved from the BMC 106 and compared to system inventory data in the JSON format that was previously transmitted to the BMC 106, according to one or more embodiments presented herein. During the third verification phase, the data integrity tool 200 retrieves the system inventory data in the JSON format from the management server 120. The system inventory data retrieved from the management server 120 is referred to herein as the "system inventory data 110C'." The data integrity tool 200 then compares the system inventory data 110C' in the JSON format that was retrieved from the management server 120 to the system inventory data 110C in the JSON format that was originally transmitted by the firmware conversion module 112 to the management server 120 in the manner described above.

If the data integrity tool 200 identifies discrepancies between the system inventory data 110C' in the JSON format retrieved from the management server 120 and the system inventory data 110C in the JSON format that was originally transmitted by the firmware conversion module 112 to the management server 120, the data integrity tool 200 updates the system inventory data integrity report 204 to reflect the discrepancy. In this manner, the system inventory data integrity report 204 can also identify discrepancies between the system inventory data 110C' in the JSON format retrieved from the management server 120 and the system inventory data 110C in the JSON format that was originally transmitted to the management server 120.

FIG. 4B is a user interface diagram showing additional aspects of an illustrative system data integrity report showing results of the comparison operation performed during the third verification phase described above with reference to FIG. 4A. In the illustrated example, the system data integrity report 204 includes a number of fields: an attribute name field that identifies the names of the attributes in the inventory data 110C for which a comparison was performed; a field indicating the values provided for the attributes in the system inventory data 110C; a field indicating the corresponding value for the attribute in the inventory data 110C'; and a field indicating the status of the comparison operation (e.g. whether the value for the attribute in the inventory data 110C matched the value for the same attribute in the inventory data 110C'). The system data integrity report 204 can include other types of data identifying other aspects of the third phase of the verification process performed by the data integrity tool 200 in other embodiments.

If the system inventory data integrity report 204 identifies discrepancies, the identified discrepancies can be utilized to modify the system inventory module 108, the firmware conversion module 112, and/or the management server 120. For instance, discrepancies identified during the first verification phase are indicative of a problem, or problems, in the system inventory module 108. Discrepancies identified during the second verification phase are indicative of problems in the firmware conversion module 112. Discrepancies identified during the third verification phase are indicative of problems with the management server 120 or another component in the BMC 106.

Figure 5A:
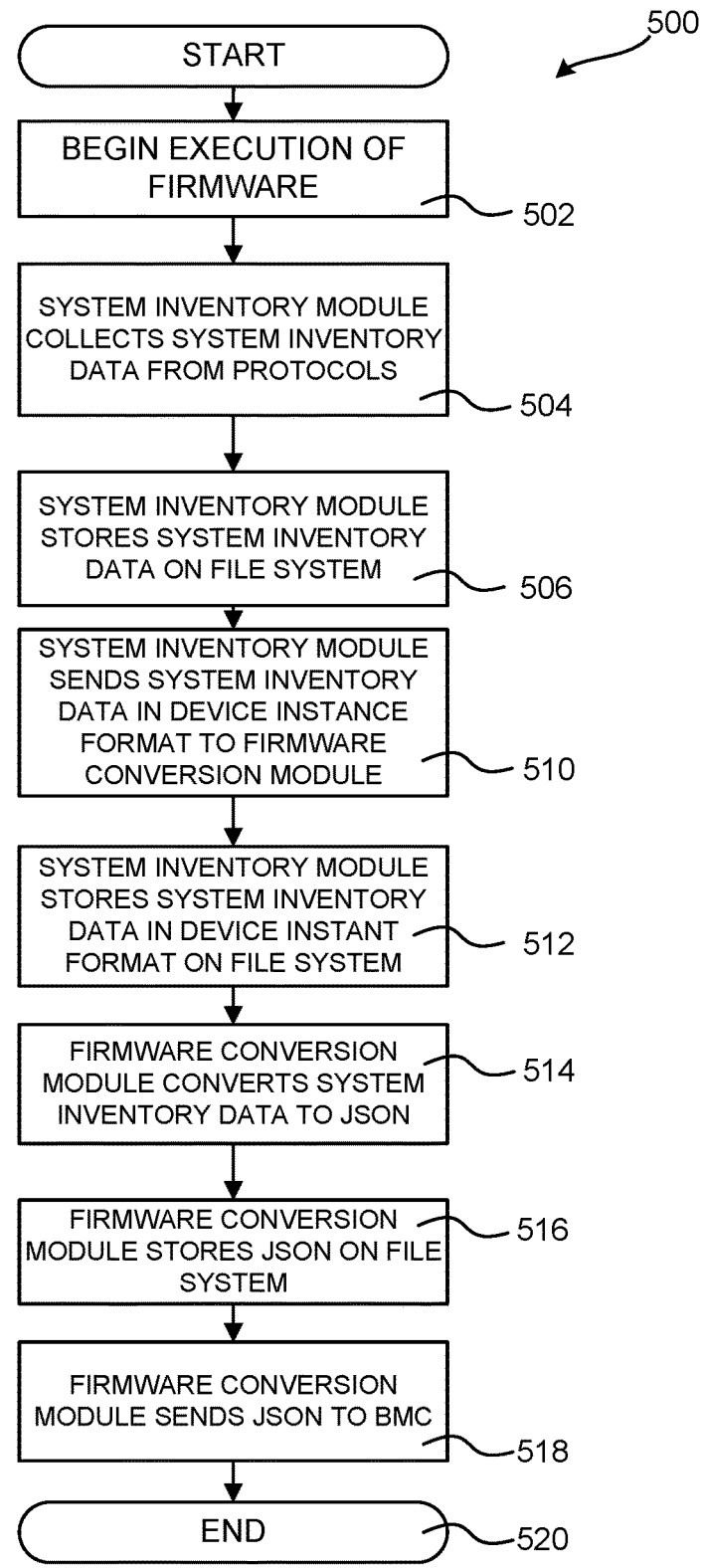
FIGS. 5A and 5B are flow diagrams showing routines that illustrate aspects of the operation of the managed computing system shown in FIG. 1 for verifying the integrity of data transmitted between a firmware and a BMC, according to one embodiment presented herein.
Figure 5B:
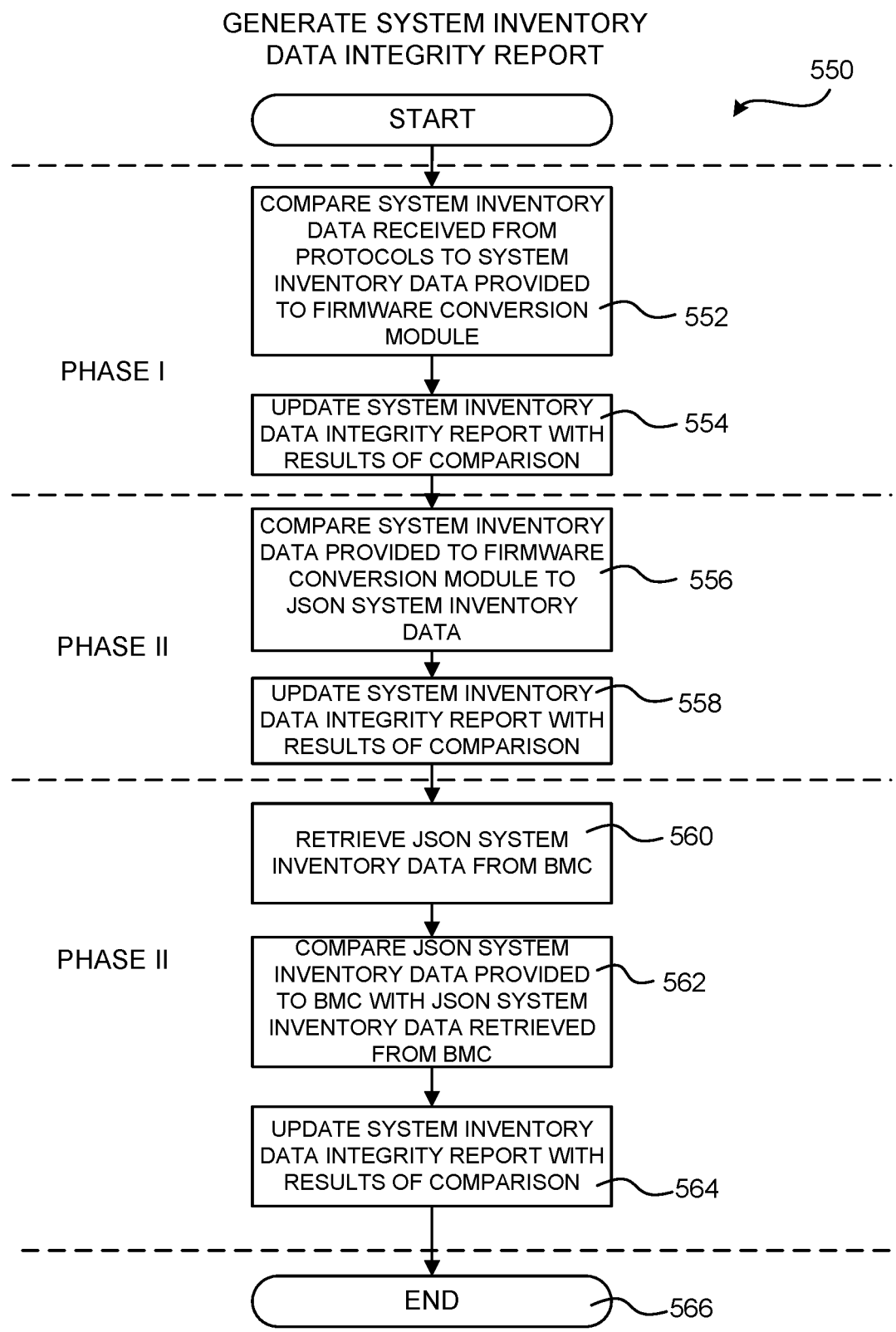

FIGS. 5A and 5B are flow diagrams showing routines 500 and 550, respectively, that illustrate aspects of the operation of the managed computing system 102 described above with reference to FIGS. 1-4B for verifying the integrity of data transmitted between a firmware 104 and a BMC 106, according to one embodiment presented herein. It is to be appreciated that the logical operations described herein with respect to FIGS. 5A and 5B, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 500 shown in FIG. 5A illustrates one method for collecting and storing system inventory data in the manner described above with regard to FIG. 1. The routine 500 begins at operation 502, where the firmware 104 of the managed computing system 102 begins execution. This might occur, for example, immediately following the powering on or rebooting of the managed computing system 102. The routine 500 then proceeds to operation 504, where the system inventory module 108 obtains the system inventory data 110A from the protocols 111. From operation 504, the routine 500 proceeds to operation 506, where the system inventory module 108 stores the system inventory data 110A on the local file system for later use by the data integrity tool 200. The routine 500 then proceeds from operation 506 to operation 510.

At operation 510, the system inventory module 108 sends the system inventory data 110B in the device instance format to the firmware conversion module 112. The routine 500 then proceeds to operation 512, where the system inventory module 108 stores the system inventory data 110B in the device instance format on the local file system for later use by the data integrity tool 200. The routine 500 then proceeds from operation 512 to operation 514.

At operation 514, the firmware conversion module 112 converts the system inventory data 110B in the device instance format to the JSON format described above. The routine 500 then proceeds to operation 516, where the firmware conversion module 112 stores the inventory data 110B on the local file system for use by the data integrity tool 200.

From operation 516, the routine 500 then proceeds to operation 518, where the firmware conversion module 112 creates a REDFISH-compatible REST HTTP request to the management server 120 that includes the JSON system inventory data 110C. In turn, the management server 120 provides the system inventory data 110C contained in the REST HTTP request to the management agent 114 for storage in the data store 116 of the BMC 106. As discussed above, the management server 108 can then make the system inventory data 110C available to management clients 118 via a REDFISH-compatible RESTful interface. The routine 500 then proceeds from operation 518 to operation 520, where it ends.

The routine 550 shown in FIG. 5B illustrates one method for generating the system inventory data integrity report 204 in the manner described above with regard to FIG. 2A-4B. The routine 550 begins at operation 552, where the data integrity tool 200 compares the system inventory data 110A received from the protocols 111 to the system inventory data 110B in the device instance format provided to the firmware conversion module 112 in the manner described above with regard to FIGS. 2A. The routine 550 then proceeds from operation 552 to operation 554, where the data integrity tool 200 updates the system inventory data integrity report 204 with the results of the comparison performed at operation 552 as illustrated in FIG. 2B. The routine 550 then proceeds from operation 554 to operation 556.

At operation 556, the data integrity tool 200 compares the system inventory data 110B in the device instance format to the system inventory data 110C in the JSON format in the manner described above with regard to FIG. 3A. The routine 550 then proceeds from operation 556 to operation 558, where the data integrity tool 200 updates the system inventory data integrity report 204 with the results of the comparison performed at operation 556 as illustrated in FIG. 3B. The routine 550 then proceeds from operation 558 to operation 560.

At operation 560, the data integrity tool 200 retrieves the system inventory data 110C' from the BMC 106. The routine 550 then proceeds to operation 562, where the data integrity tool 200 compares the system inventory data 110C to the system inventory data 110C' in the JSON format retrieved from the BMC 106 in the manner described above with regard to FIGS. 4A. The routine 550 then proceeds from operation 562 to operation 564, where the data integrity tool 200 updates the system inventory data integrity report 204 with the results of the comparison performed at operation 562 as illustrated in FIG. 4B. The routine 550 then proceeds from operation 564 to operation 566, where it ends.

Figure 6:
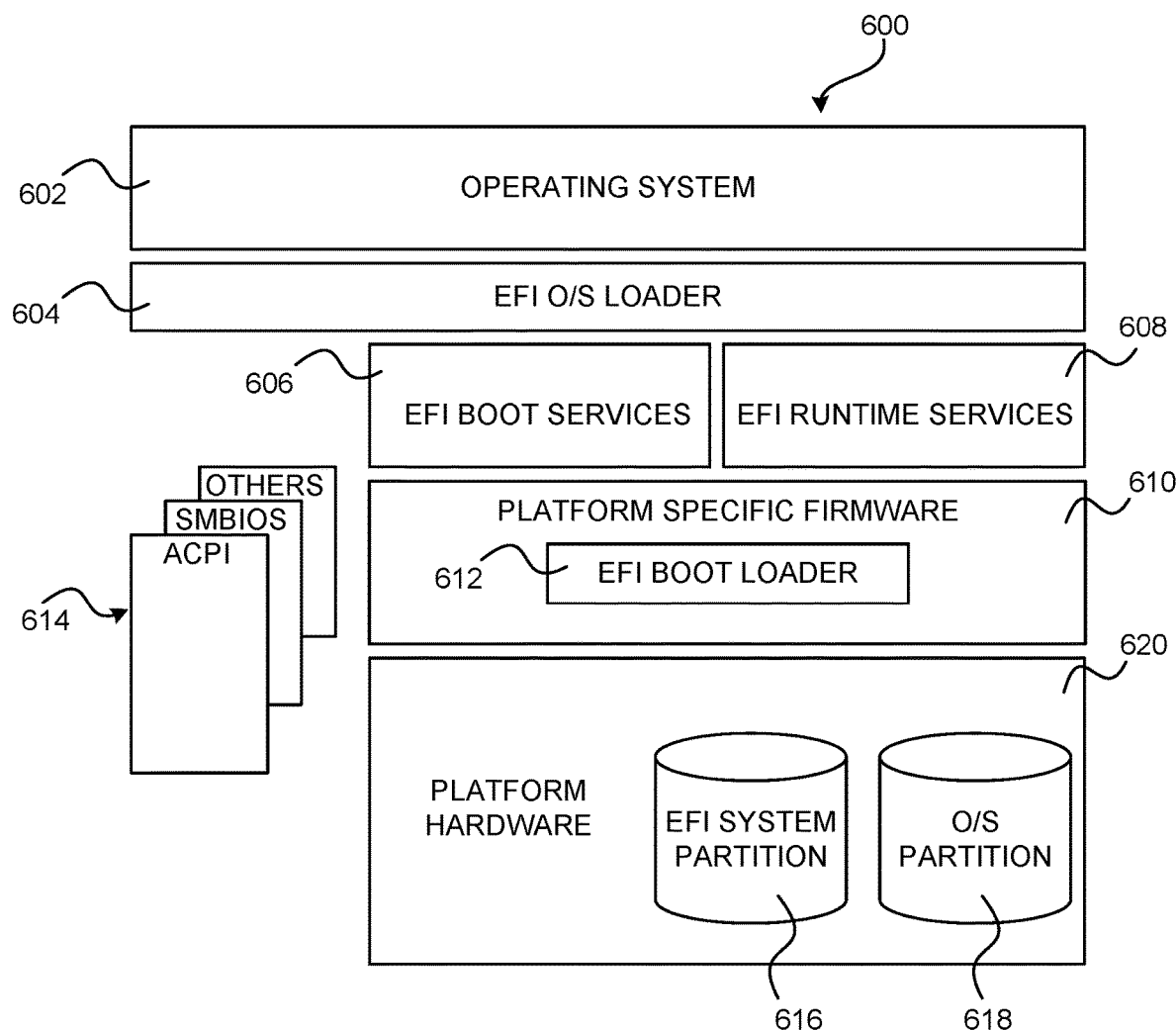
FIG. 6 is a software architecture diagram illustrating a software architecture for a unified extensible firmware interface ("UEFI")—compliant firmware that provides an operating environment for aspects of the technologies presented herein in one embodiment.

Turning now to FIG. 6, a software architecture diagram will be described that illustrates an architecture for a Unified Extensible Firmware Interface ("UEFI") Specification-compliant firmware 600 that can be configured to provide and/or utilize aspects of the technologies disclosed herein. In particular, the firmware architecture shown in FIG. 6 can be utilized to implement the firmware 104 described above. The firmware 104 can also be implemented in other ways in other configurations.

The UEFI Specification describes an interface between an operating system 602 and a UEFI Specification-compliant firmware 600. The UEFI Specification also defines an interface that a firmware 600 can implement, and an interface that an operating system 602 (which might be referred to herein as an "OS") can use while booting. How a firmware implements the interface can be left up to the manufacturer of the firmware. The UEFI Specification also defines a way for an operating system 602 and a firmware 600 to exchange information necessary to support the operating system boot process. The term "UEFI Specification" used herein refers to both the EFI Specification developed by INTEL CORPORATION and the UEFI Specification managed by the UEFI FORUM.

As shown in FIG. 6, the architecture can include platform hardware 620, such as that described below with regard to FIG. 7, and an operating system 602. A boot loader 612 for the operating system 602 can be retrieved from the UEFI system partition 616 using a UEFI operating system loader 604. The UEFI system partition 616 can be an architecturally shareable system partition. As such, the UEFI system partition 616 can define a partition and file system designed to support safe sharing of mass storage between multiple vendors. An OS partition 618 can also be utilized.

Once started, the UEFI OS loader 604 can continue to boot the complete operating system 602. In doing so, the UEFI OS loader 604 can use UEFI boot services 606, an interface to other supported specifications to survey, comprehend, and initialize the various platform components and the operating system software that manages them. Thus, interfaces 614 from other specifications can also be present on the system. For example, the ACPI and the System Management BIOS ("SMBIOS") specifications can be supported.

UEFI boot services 606 can provide interfaces for devices and system functionality used during boot time. UEFI runtime services 608 can also be available to the UEFI OS loader 604 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 602 and system firmware 600, the Framework is a group of specifications that together describe a firmware implementation that has been designed to perform the full range of operations that are required to initialize a platform from power on through transfer of control to the operating system 602. The specifications that make up the Framework, which are also available from INTEL CORPORATION, are also expressly incorporated herein by reference.

Figure 7:
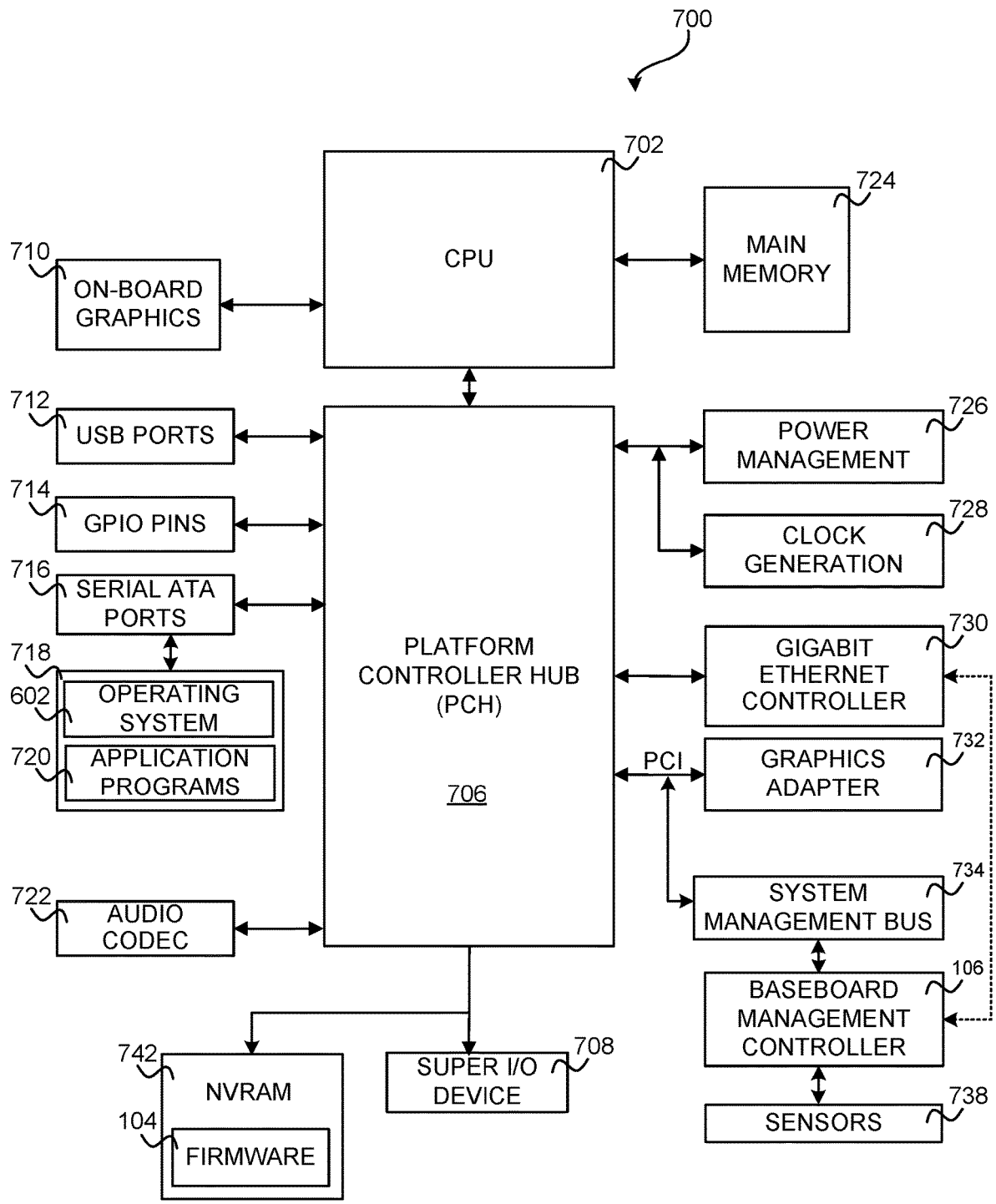
FIG. 7 is a computer architecture diagram that shows an illustrative architecture for a computer that can implement the technologies disclosed herein.

Referring now to FIG. 7, a computer architecture diagram that shows an illustrative architecture for a computer that can provide an operating environment for the technologies presented herein will be described. For example, and without limitation, the computer architecture shown in FIG. 7 can be utilized to implement the managed computing system 102 and/or any of the other computing systems disclosed herein.

FIG. 7 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 7 shows an illustrative computer architecture for a computer 700 that can be utilized in the implementations described herein. The illustrative computer architecture shown in FIG. 7 is for the computer 700, and includes a baseboard, or "motherboard", which is a printed circuit board to which a multitude of components or devices can be connected by way of a system bus or other electrical communication path. In one illustrative configuration, a central processing unit ("CPU") 702 operates in conjunction with a Platform Controller Hub ("PCH") 706. The CPU 702 is a central processor that performs arithmetic and logical operations necessary for the operation of the computer 700. The computer 700 can include a multitude of CPUs 702. Each CPU 702 might include multiple processing cores.

The CPU 702 provides an interface to a random access memory ("RAM") used as the main memory 724 in the computer 700 and, possibly, to an on-board graphics adapter 710. The PCH 706 provides an interface between the CPU 702 and the remainder of the computer 700.

The PCH 606 can also be responsible for controlling many of the input/output functions of the computer 700. In particular, the PCH 706 can provide one or more universal serial bus ("USB") ports 712, an audio codec 722, a Gigabit Ethernet Controller 732, and one or more general purpose input/output ("GPIO") pins 714. The USB ports 712 can include USB 2.0 ports, USB 3.0 ports and USB 3.1 ports among other USB ports. The audio codec 722 can include Intel High Definition Audio, Audio Codec '97 ("AC'97") and Dolby TrueHD among others.

The PCH 706 can also include functionality for providing networking functionality through a Gigabit Ethernet Controller 730. The Gigabit Ethernet Controller 730 is capable of connecting the computer 700 to another computer via a network. Connections which can be made by the Gigabit Ethernet Controller 730 can include LAN or WAN connections. LAN and WAN networking environments are commonplace in offices, enterprise-wide computer networks, intranets, and the Internet.

The PCH 706 can also provide a bus for interfacing peripheral card devices such as a graphics adapter 732. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 706 can also provide a system management bus 734 for use in managing the various components of the computer 700. Additional details regarding the operation of the system management bus 734 and its connected components are provided below. Power management circuitry 726 and clock generation circuitry 728 can also be utilized during the operation of the PCH 706.

The PCH 706 is also configured to provide one or more interfaces for connecting mass storage devices to the computer 700. For instance, according to one configuration, the PCH 706 includes a serial advanced technology attachment ("SATA") adapter for providing one or more serial ATA ports 716. The serial ATA ports 716 can be connected to one or more mass storage devices storing an OS, such as OS 602 and application programs 720, such as a SATA disk drive 718. As known to those skilled in the art, an OS 602 comprises a set of programs that control operations of a computer and allocation of resources. An application program is software that runs on top of the operating system 602, or other runtime environment, and uses computer resources to perform application specific tasks desired by the user.

According to one configuration, the OS 602 comprises the LINUX operating system. According to another configuration, the OS 602 comprises the WINDOWS operating system from MICROSOFT CORPORATION. According to another configuration, the OS 602 comprises the UNIX operating system or one of its variants. It should be appreciated that other operating systems can also be utilized.

The mass storage devices connected to the PCH 706, and their associated computer-readable storage media, provide non-volatile storage for the computer 700. Although the description of computer-readable storage media contained herein refers to a mass storage device, such as a hard disk or CD-ROM drive, it should be appreciated by those skilled in the art that computer-readable storage media can be any available media that can be accessed by the computer 700.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 700.

A low pin count ("LPC") interface can also be provided by the PCH 706 for connecting a Super I/O device 708. The Super I/O device 708 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 742 for storing firmware 104 that includes program code containing the basic routines that help to start up the computer 700 and to transfer information between elements within the computer 700 as discussed above with regard to FIG. 6.

It should be appreciated that the program modules disclosed herein, including the firmware 104, can include software instructions that, when loaded into the CPU 702 and executed, transform a general-purpose computer 700 into a special-purpose computer 700 customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

The CPU 702 can be constructed from any number of transistors or other circuit elements, which can individually or collectively assume any number of states. More specifically, the CPU 702 can operate as a state machine or finite-state machine. Such a machine can be transformed to a second machine, or a specific machine, by loading executable instructions contained within the program modules. These computer-executable instructions can transform the CPU 702 by specifying how the CPU 702 transitions between states, thereby transforming the transistors or other circuit elements constituting the CPU 702 from a first machine to a second machine, wherein the second machine can be specifically configured to perform the operations disclosed herein. The states of either machine can also be transformed by receiving input from one or more user input devices, network interfaces (such as the Gigabit Ethernet Controller 730), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 724 and/or NVRAM 704. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 706 can include a system management bus 734. As discussed above, when utilized to implement the managed computing system 102, the system management bus 734 can include a BMC 106. As discussed above, the BMC 106 is a microcontroller that monitors operation of the computer 700. In a more specific configuration, the BMC 106 monitors the inventory and health-related aspects associated with the computer 700, such as, but not limited to, the temperature of one or more components of the computer 700, speed of rotational components (e.g., spindle motor, CPU fan, etc.) within the computer 700, the voltage across or applied to one or more components within the computer 700, and the available and/or used capacity of memory devices within the computer 700. To accomplish these monitoring functions, the BMC 106 is communicatively connected to one or more components by way of the system management bus 734 in some configurations.

In one configuration, these components include sensor devices 738 for measuring various operating and performance-related parameters within the computer 700. The sensor devices 738 can be either hardware or software based components configured or programmed to measure or detect one or more of the various operating and performance-related parameters.

The BMC 106 functions as the master on the system management bus 734 in most circumstances but can also function as either a master or a slave in other circumstances. Each of the various components communicatively connected to the BMC 106 by way of the system management bus 734 is addressed using a slave address. The system management bus 734 is used by the BMC 106 to request and/or receive various operating and performance-related parameters from one or more components, such as the firmware 104, which are also communicatively connected to the system management bus 734.

It should be appreciated that the functionality provided by the computer 700 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 700 might not include all the components shown in FIG. 7, can include other components that are not explicitly shown in FIG. 7, or might utilize an architecture completely different than that shown in FIG. 7.

Based on the foregoing, it should be appreciated that technologies for verifying the integrity of data transmitted between a firmware and a BMC have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:
1. A computer-implemented method, comprising:
 obtaining, by way of a first firmware module in a firmware of a managed computing system, system inventory data identifying components of the managed computing system, the system inventory data provided by one or more firmware protocols;
 generating, by way of the first firmware module, system inventory data in a device instance format from the system inventory data provided by the one or more firmware protocols;
 providing the system inventory data in the device instance format from the first firmware module to second firmware module in the firmware;
 generating, by way of the second firmware model, system inventory data in a JavaScript Object Notation (JSON) format from the system inventory data in the device instance format;
 transmitting the system inventory data in the JSON format to a management server of a baseboard management controller (BMC) in the managed computing system;
 during a first verification phase, verifying operation of the first firmware module by comparing the system inven- tory data provided by the one or more firmware protocols to the system inventory data in the device instance format;

during a second verification phase, verifying operation of the second firmware module by comparing the system inventory data in the device instance format to the system inventory data in the JSON format;

during a third verification phase, retrieving the system inventory data in the JSON format from the management server and comparing the system inventory data in the JSON format retrieved from the management server to the system inventory data in the JSON format transmitted to the management server; and updating a system inventory data integrity report based upon the comparing performed during the first verification phase, the second verification phase, and the third verification phase.

2. The computer-implemented method of claim 1, wherein the comparing performed during the first verification phase, the second verification phase, and the third verification phase is performed using property mapping data.

3. The computer-implemented method of claim 2, wherein the system inventory data integrity report identifies discrepancies between the system inventory data provided by the one or more firmware protocols and the system inventory data in the device instance format.

4. The computer-implemented method of claim 3, wherein the system inventory data integrity report identifies discrepancies between the system inventory data in the device instance format and the system inventory data in the JSON format.

5. The computer-implemented method of claim 4, wherein the system inventory data integrity report identifies discrepancies between the system inventory data in the JSON format retrieved from the management server and the system inventory data in the JSON format transmitted to the management server.

6. The computer-implemented method of claim 5, further comprising modifying one or more of the first firmware module, the second firmware module, or the management server based upon the system inventory data integrity report.

7. The computer-implemented method of claim 6, wherein the system inventory data in the JSON format is based on an Open Data Protocol (OData).

8. The computer-implemented method of claim 7, wherein the system inventory data is obtained at a boot time of the computing system.

9. A non-transitory computer-readable storage medium having computer-executable instructions stored thereupon which, when executed by a computing system, cause the computing system to:

obtain, by way of a first firmware module in a firmware of the computing system, system inventory data identifying components of the computing system, the system inventory data provided by one or more firmware protocols;

generate, by way of the first firmware module, system inventory data in a device instance format from the system inventory data provided by the one or more firmware protocols;

provide the system inventory data in the device instance format from the first firmware module to second firmware module in the firmware;

generate, by way of the second firmware model, system inventory data in a JavaScript Object Notation (JSON) format from the system inventory data in the device instance format;

transmit the system inventory data in the JSON format to a management server of a baseboard management controller (BMC) in the computing system;

during a first verification phase, verify operation of the first firmware module by comparing the system inventory data provided by the one or more firmware protocols to the system inventory data in the device instance format;

during a second verification phase, verify operation of the second firmware module by comparing the system inventory data in the device instance format to the system inventory data in the JSON format;

during a third verification phase, retrieve the system inventory data in the JSON format from the management server and compare the system inventory data in the JSON format retrieved from the management server to the system inventory data in the JSON format transmitted to the management server; and update a system inventory data integrity report based upon the comparing performed during the first verification phase, the second verification phase, and the third verification phase.

10. The non-transitory computer-readable storage medium of claim 9, wherein the comparing performed during the first verification phase, the second verification phase, and the third verification phase is performed using property mapping data.

11. The non-transitory computer-readable storage medium of claim 10, wherein the system inventory data integrity report identifies discrepancies between the system inventory data provided by the one or more firmware protocols and the system inventory data in the device instance format.

12. The non-transitory computer-readable storage medium of claim 11, wherein the system inventory data integrity report identifies discrepancies between the system inventory data in the device instance format and the system inventory data in the JSON format.

13. The non-transitory computer-readable storage medium of claim 12, wherein the system inventory data integrity report identifies discrepancies between the system inventory data in the JSON format retrieved from the management server and the system inventory data in the JSON format transmitted to the management server.

14. The non-transitory computer-readable storage medium of claim 13, having further computer-executable instructions stored thereupon which, when executed by the computing system, cause the computing system to modify one or more of the first firmware module, the second firmware module, or the management server based upon the system inventory data integrity report.

15. The non-transitory computer-readable storage medium of claim 14, wherein the system inventory data in the JSON format is based on an Open Data Protocol (OData).

16. A computing system, comprising:
one or more processors;
a baseboard management controller; and
at least one non-transitory computer-readable storage medium having computer-executable instructions stored thereupon which, when executed by the one or more processors, cause the system to:

obtain, by way of a first firmware module in a firmware of the computing system, system inventory data identifying components of the computing system, the system inventory data provided by one or more firmware protocols;

generate, by way of the first firmware module, system inventory data in a device instance format from the system inventory data provided by the one or more firmware protocols;

provide the system inventory data in the device instance format from the first firmware module to second firmware module in the firmware;

generate, by way of the second firmware model, system inventory data in a JavaScript Object Notation (JSON) format from the system inventory data in the device instance format;

transmit the system inventory data in the JSON format to a management server of a baseboard management controller (BMC) in the computing system;

during a first verification phase, verify operation of the first firmware module by comparing the system inventory data provided by the one or more firmware protocols to the system inventory data in the device instance format;

during a second verification phase, verify operation of the second firmware module by comparing the system inventory data in the device instance format to the system inventory data in the JSON format;

during a third verification phase, retrieve the system inventory data in the JSON format from the management server and compare the system inventory data in the JSON format retrieved from the management server to the system inventory data in the JSON format transmitted to the management server; and update a system inventory data integrity report based upon the comparing performed during the first verification phase, the second verification phase, and the third verification phase.

17. The computing system of claim 16, wherein the system inventory data integrity report identifies discrepancies between the system inventory data provided by the one or more firmware protocols and the system inventory data in the device instance format.

18. The computing system of claim 17, wherein the system inventory data integrity report identifies discrepancies between the system inventory data in the device instance format and the system inventory data in the JSON format.

19. The computing system of claim 18, wherein the system inventory data integrity report identifies discrepancies between the system inventory data in the JSON format retrieved from the management server and the system inventory data in the JSON format transmitted to the management server.

20. The computing system of claim 19, wherein the non-transitory computer-readable storage medium has further computer-executable instructions stored thereupon which, when executed by the computing system, cause the computing system to modify one or more of the first firmware module, the second firmware module, or the management server based upon the system inventory data integrity report.

* * * * *